(12) United States Patent
Sugaya

(10) Patent No.: US 11,956,543 B2
(45) Date of Patent: Apr. 9, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomohiro Sugaya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/588,482

(22) Filed: Jan. 31, 2022

(65) Prior Publication Data

US 2022/0256085 A1 Aug. 11, 2022

(30) Foreign Application Priority Data

Feb. 5, 2021 (JP) ................................. 2021-017741

(51) Int. Cl.
| | |
|---|---|
| H04N 5/232 | (2006.01) |
| G03B 5/00 | (2021.01) |
| G06V 10/22 | (2022.01) |
| H04N 23/68 | (2023.01) |
| H04N 23/69 | (2023.01) |

(52) U.S. Cl.
CPC ............ H04N 23/687 (2023.01); G03B 5/00 (2013.01); G06V 10/22 (2022.01); H04N 23/6811 (2023.01); H04N 23/6812 (2023.01); H04N 23/69 (2023.01); *G03B 2205/0007* (2013.01); *G06T 2207/20021* (2013.01)

(58) Field of Classification Search
CPC ........... H04N 5/23267; H04N 5/23296; H04N 23/685; H04N 23/69

USPC ......................................... 348/208.6, 240.99
See application file for complete search history.

(56) References Cited

U.S. PATENT DOCUMENTS

| | | | | |
|---|---|---|---|---|
| 2011/0122268 A1* | 5/2011 | Okamoto | ............... | H04N 23/69 348/E5.031 |
| 2017/0034410 A1* | 2/2017 | Yoo | ...................... | H04N 23/632 |
| 2017/0171475 A1* | 6/2017 | Shibata | .............. | H04N 23/6811 |
| 2018/0063437 A1* | 3/2018 | Ikeda | ................ | H04N 23/6811 |
| 2018/0288329 A1* | 10/2018 | Wada | ................... | G02B 27/646 |

(Continued)

FOREIGN PATENT DOCUMENTS

| | | | | |
|---|---|---|---|---|
| CN | 101690236 A | * | 3/2010 | ......... H04N 5/23248 |
| JP | 2013192270 A | * | 9/2013 | |
| JP | 2017-098829 A | | 6/2017 | |

*Primary Examiner* — Anthony J Daniels
(74) *Attorney, Agent, or Firm* — Cowan, Liebowitz & Latman, P.C.

(57) ABSTRACT

An image processing apparatus includes an electronic zoom unit, a motion vector detection unit, a first representative vector calculation unit, a second representative vector calculation unit, and a third representative vector calculation unit, wherein the third representative vector calculation unit determines the third representative motion vector by setting a weight of the first representative motion vector greater than a weight of the second representative motion vector when an enlargement magnification in the electronic zoom unit is equal to or greater than a threshold, and determines the third representative motion vector by setting a weight of the second representative motion vector greater than a weight of the first representative motion vector when an enlargement magnification in the electronic zoom unit is less than the threshold.

24 Claims, 10 Drawing Sheets

(56) References Cited

U.S. PATENT DOCUMENTS

| | | | |
|---|---|---|---|
| 2019/0026863 A1* | 1/2019 | Yasutomi | H04N 5/2628 |
| 2021/0250505 A1* | 8/2021 | Lee | H04N 5/23277 |
| 2021/0392268 A1* | 12/2021 | Jung | H04N 5/23267 |

* cited by examiner

— ENTIRE IMAGING REGION
---- ELECTRONIC ENLARGEMENT REGION

IMAGING REGION OF TIME t0

— ENTIRE IMAGING REGION
---- ELECTRONIC ENLARGEMENT REGION

ENLARGEMENT REGION OF TIME t0

— ENTIRE IMAGING REGION
---- ELECTRONIC ENLARGEMENT REGION

IMAGING REGION OF TIME t1

— ENTIRE IMAGING REGION
---- ELECTRONIC ENLARGEMENT REGION

ENLARGEMENT REGION OF TIME t1

MOTION VECTOR OF IMAGING REGION OF TIME t1

MOTION VECTOR OF ENLARGEMENT REGION OF TIME t1

HISTOGRAM OF MOTION VECTOR WITHIN IMAGING REGION OF TIME t1

HISTOGRAM OF MOTION VECTOR WITHIN ENLARGEMENT REGION OF TIME t1

— ENTIRE IMAGING REGION
---- ELECTRONIC ENLARGEMENT REGION

IMAGING REGION OF TIME t0

— ENTIRE IMAGING REGION
---- ELECTRONIC ENLARGEMENT REGION

ENLARGEMENT REGION OF TIME t0

— ENTIRE IMAGING REGION
---- ELECTRONIC ENLARGEMENT REGION

IMAGING REGION OF TIME t1

— ENTIRE IMAGING REGION
---- ELECTRONIC ENLARGEMENT REGION

ENLARGEMENT REGION OF TIME t1

— ENTIRE IMAGING REGION
---- ELECTRONIC ENLARGEMENT REGION

MOTION VECTOR OF IMAGING REGION OF TIME t1

— ENTIRE IMAGING REGION
---- ELECTRONIC ENLARGEMENT REGION

MOTION VECTOR OF ENLARGEMENT REGION OF TIME t1

HISTOGRAM OF MOTION VECTOR WITHIN IMAGING REGION OF TIME t1

HISTOGRAM OF MOTION VECTOR WITHIN ENLARGEMENT REGION OF TIME t1

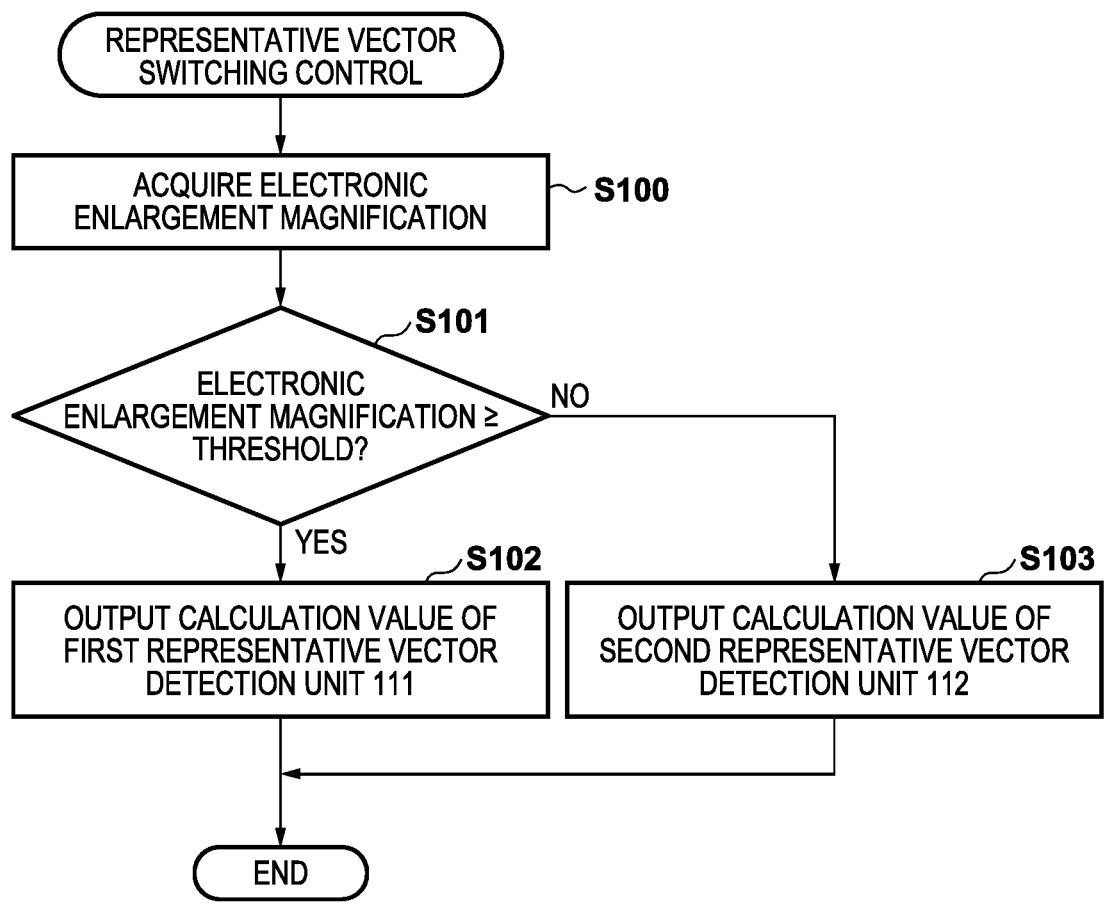

— ENTIRE IMAGING REGION
---- ELECTRONIC ENLARGEMENT REGION

ELECTRONIC ENLARGEMENT REGION

RELATIONSHIP OF ELECTRONIC ENLARGEMENT REGION AND ANGLE

RELATIONSHIP CHART OF ELECTRONIC ENLARGEMENT MAGNIFICATION AND HAND SHAKE ANGLE

IMAGE PROCESSING APPARATUS, IMAGE PROCESSING METHOD, AND STORAGE MEDIUM

BACKGROUND OF THE INVENTION

Field of the Invention

The present invention relates to an image processing apparatus having an image blur correction function.

Description of the Related Art

The image blur correction function in the camera has the following two image blur correction methods. One is optical image stabilization that moves, in a direction different from an optical axis, a correction lens provided in a part of a lens group based on the shake applied to the camera. The other is electronic image stabilization that reduces misalignment between frames of a video by displaying and recording a video output by changing a readout position of an imaging element based on a shake of the camera.

Methods of detecting a shake applied to a camera include a method of using a sensor such as an angular velocity sensor or an acceleration sensor whose output varies in accordance with a shake, and a method of detecting a motion vector from a captured video and using the motion vector as shake information.

The camera generally includes a zoom function, whose methods include optical zoom by a lens group that moves in the optical axis direction, and electronic zoom of enlarging and reducing an image by changing the readout region (size) of the imaging element. In the case of electronic zoom, there is a disadvantage that the number of pixels included in the readout region decreases as the magnification becomes high, but high-magnification zoom can be achieved without changing the lens size as in optical zoom.

Here, although this is applied not only to electronic zoom but also to optical zoom, as the zoom becomes high magnification, even a slight shake of camera results in a large change amount in an angle of view in image taking, making it difficult for the photographer to keep capturing a subject.

A number of techniques for a camera to automatically track a subject have been proposed. For example, Japanese Patent Laid-Open No. 2017-098829 proposes a method of achieving subject tracking by setting a detection region of a motion vector so that a moving subject is easily detected, and causing an optical image stabilization mechanism to track in accordance with the detected motion vector.

However, in the method disclosed in Japanese Patent Laid-Open No. 2017-098829, the detection region of the motion vector is set depending on the photographing mode. A motion vector detection region for subject tracking is always set in the photographing mode of panning shooting, for example, and a motion vector detection region for image blur correction is always set in the image blur correction mode. That is, it is not assumed to dynamically switch the motion vector detection region in the same photographing mode.

With the previous electronic zoom as an example, when the zoom magnification becomes high, the photographer becomes difficult to capture the subject, and in this case, it is preferable that the camera automatically switches to track the subject. If the zoom magnification is low, the photographer can capture the subject by his own camera operation, and hence, conversely, the camera that automatically tracks the subject will inhibit the camera work the photographer intended. Thus, in this case, it is preferable that the motion vector is detected from a background region not including the main subject, and image blur correction is performed.

SUMMARY OF THE INVENTION

The present invention is made in view of the problem described above, an object of the present invention is to provide an image processing apparatus that can perform appropriate image blur correction operation and subject tracking operation in accordance with the zoom magnification.

According to a first aspect of the present invention, there is provided an image processing apparatus comprising: at least one processor or circuit configured to function as: an electronic zoom unit configured to enlarge and output a predetermined region from a captured image; a motion vector detection unit configured to detect a motion vector from a plurality of captured images; a first representative vector calculation unit configured to calculate a first representative motion vector by setting a weight of a first motion vector detected in the predetermined region greater than a weight of a second motion vector detected in a region outside the predetermined region; a second representative vector calculation unit configured to calculate a second representative motion vector by setting a weight of the second motion vector with respect to the first motion vector greater than the first representative vector calculation unit; and a third representative vector calculation unit configured to calculate a third representative motion vector based on the first representative motion vector and the second representative motion vector, wherein the third representative vector calculation unit determines the third representative motion vector by setting a weight of the first representative motion vector greater than a weight of the second representative motion vector when an enlargement magnification in the electronic zoom unit is equal to or greater than a threshold, and determines the third representative motion vector by setting a weight of the second representative motion vector greater than a weight of the first representative motion vector when an enlargement magnification in the electronic zoom unit is less than the threshold.

According to a second aspect of the present invention, there is provided an image processing method, comprising: performing electronic enlargement of enlarging and outputting a predetermined region from a captured image; detecting a motion vector from a plurality of captured images; calculating a first representative motion vector by setting a weight of a first motion vector detected in the predetermined region greater than a weight of a second motion vector detected in a region outside the predetermined region; calculating a second representative motion vector by setting a weight of the second motion vector greater than a weight of the first motion vector; and calculating a third representative motion vector based on the first representative motion vector and the second representative motion vector, wherein in calculation of the third representative motion vector, the third representative motion vector is determined by setting a weight of the first representative motion vector greater than a weight of the second representative motion vector when an enlargement magnification in the electronic enlargement is equal to or greater than a threshold, and the third representative motion vector is determined by setting a weight of the second representative motion vector greater than a weight of the first representative motion vector when an enlargement magnification in the electronic enlargement is less than the threshold.

Further features of the present invention will become apparent from the following description of exemplary embodiments with reference to the attached drawings.

BRIEF DESCRIPTION OF THE DRAWINGS

FIG. 4 is a flowchart explaining an example of processing of a representative vector switching control unit in the first embodiment.

DESCRIPTION OF THE EMBODIMENTS

Figure 1:
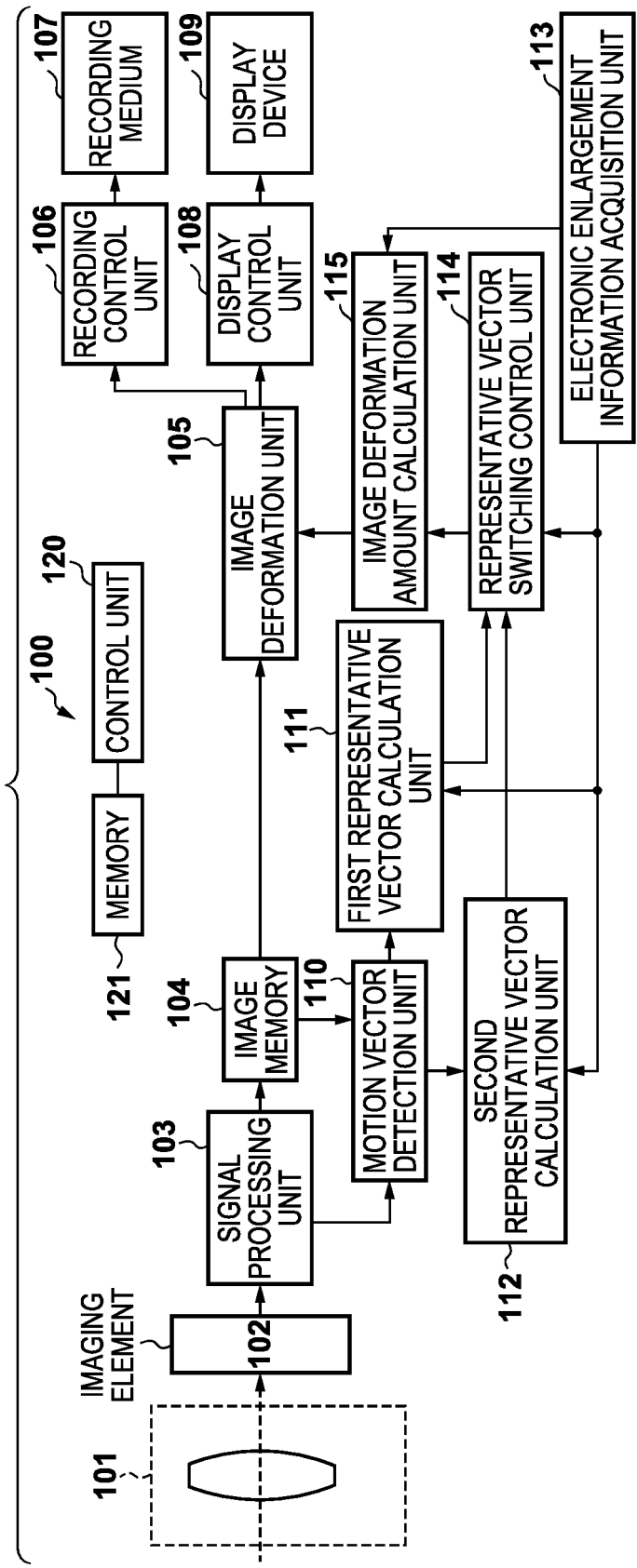
FIG. 1 is a block diagram illustrating a configuration of a video camera that is a first embodiment of an image processing apparatus according to the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the configuration of a video camera that is the first embodiment of the image processing apparatus according to the present invention. An example of the configuration of a video camera 100 of FIG. 1 and an example of the operation thereof will be described in details below. Note that in the present embodiment, an example in which the present invention is applied to a video camera is described, but the present invention can also be applied to a still camera having a movie capturing function.

An imaging lens 101 is an imaging optical system constituted by a plurality of lens groups. An imaging element 102 is an element that converts an optical image into an electric signal and includes a CCD or a CMOS element. A subject image formed by the imaging lens 101 is converted into an analog image signal by the imaging element 102, and this analog image signal is output to a signal processing unit 103 as a captured image signal. The signal processing unit 103 converts the input captured image signal to a digital signal by A/D conversion subsequently performs predetermined signal processing.

The signal processing unit 103 generates a video signal conforming to, for example, NTSC format from a signal obtained by the imaging element 102, and supplies the video signal to an image memory 104 and a motion vector detection unit 110.

By changing the reading region and the readout position (changing an angle of view) when reading an image signal from the image memory 104, an image deformation unit 105 achieves the functions of electronic zoom and electronic image stabilization. For example, the electronic zoom function is a function of displaying and recording an electronically enlarged image by reducing the region of reading out the image from the image memory. The electronic image stabilization function is a function of correcting misalignment of an image between frames by changing the readout position of the image from the image memory 104 in a direction where the misalignment between the images generated by the camera shake is canceled. The video data output from the image deformation unit 105 is supplied to a recording control unit 106.

When instructed to record a video signal by an operation unit (not illustrated) used to instruct recording start and recording end, the recording control unit 106 records the video signal supplied from the image deformation unit 105 onto a recording medium 107. The recording medium 107 is, for example, an information recording medium such as a semiconductor memory or a magnetic recording medium such as a hard disk.

A display control unit 108 causes a display device 109 to display the video signal supplied from the image deformation unit 105. The display control unit 108 drives the display device 109, and the display device 109 displays an image by a liquid crystal display element (LCD) or the like.

The motion vector detection unit 110 detects a motion vector of an image based on a luminance signal included in the current video signal generated by the signal processing unit 103 and a luminance signal included in the video signal one field before (or one frame before) stored in the image memory 104. For the motion vector detection method, for example, a block matching method having been proposed is used.

The block matching method is a method of dividing a captured image into regions called blocks, and detecting, in units of blocks, similar parts between the captured image one frame before and the current captured image, for example. In an arbitrary range in the captured image one frame before, the part where the correlation value with an arbitrary block in the current captured image is the highest is set to a similar block position. A displacement amount between an arbitrary block position in the current captured image and a similar block position in the captured image one frame before is determined, and motion information between frames of the captured image, i.e., motion vector, is detected.

A first representative vector calculation unit 111 and a second representative vector calculation unit 112 calculate an overall motion vector from a motion vector in units of a plurality of blocks output from the motion vector detection unit 110. Here, the first representative vector calculation unit 111 acquires information on an electronic enlargement region from an electronic enlargement information acquisition unit 113, and calculates a representative motion vector (first representative motion vector) based on the motion vector detected in the electronic enlargement region. However, when an effective motion vector is not obtained in the electronic enlargement region, a motion vector outside the electronic enlargement region may be used. In addition, a motion vector in the electronic enlargement region only needs to be preferentially used, such as weighting the motion vector in the electronic enlargement region higher than the motion vector outside the electronic enlargement region. Note that in the present invention and the present description, calculating a third value by increasing the weight of the other with respect to one shall also include calculating a third value using only one and not using the other. That is, calculating, by the first representative vector calculation unit 111, a representative motion vector based on a motion vector detected in the electronic enlargement region, not based on a motion vector detected outside the electronic enlargement region shall also be included in calculating a representative motion vector by weighting the motion vector in the electronic enlargement region higher than the motion vector outside the electronic enlargement region.

The second representative vector calculation unit 112 calculates a representative motion vector from the motion vector detected in the entire imaging region including the outside of the electronic enlargement region. Therefore, the representative motion vector (second representative motion vector) is calculated by increasing the weight of the motion vector outside the electronic enlargement region for the motion vector in the electronic enlargement region compared with the first representative vector calculation unit 111. For example, the first representative vector calculation unit 111 calculates the representative motion vector by weighting the motion vector in the electronic enlargement region with 1, and the motion vector outside the electronic enlargement region with 0. On the other hand, the second representative vector calculation unit 112 weights the motion vector in and outside of the electronic enlargement region with 1 to calculate a representative motion vector. The second representative vector calculation unit 112 is intended to calculate a motion vector of the background region. For this reason, known techniques may be used, such as a method of setting the priority of a motion vector of a peripheral region high on an assumption that a main subject is captured near the center, a method of determining and excluding a moving subject, and a method of specifying a fixed subject by subject determination.

As the calculation method of the representative vector in the present embodiment, for example, a method of generating a histogram (frequency distribution) indicating the frequency of the magnitude (class) of the motion vector in units of blocks, and determining a motion vector with a large frequency as a representative vector is used.

The electronic enlargement information acquisition unit 113 acquires information regarding the electronic enlargement performed by the electronic zoom function, and outputs the information to each processing unit. The information regarding the electronic enlargement includes an electronic enlargement magnification, a horizontal and vertical resolutions of the electronic enlargement region, address information on a part to be electronically enlarged, i.e. the electronic enlargement region on the image memory 104. Note that the electronic enlargement magnification can be calculated from the horizontal and vertical resolutions of the electronic enlargement region. Thus, the description of acquiring the electronic enlargement magnification from the electronic enlargement information acquisition unit 113 in the following description also includes a case in which the horizontal and vertical resolutions of the electronic enlargement region is acquired instead of the electronic enlargement magnification itself. That is, the acquired information only needs to be at least one of an electronic enlargement magnification and horizontal and vertical resolutions of the electronic enlargement region.

A representative vector switching control unit 114 determines the representative vector to be input to an image deformation amount calculation unit 115 among the representative vectors determined by the first representative vector calculation unit 111 and the second representative vector calculation unit 112. Details of the switching control of the representative vector in the representative vector switching control unit 114 will be described later, but the switching control is generally performed as follows. That is, when the subject tracking function is implemented by change in the readout position from the image memory 104, a representative vector of the first representative vector calculation unit 111 is employed, and when the electronic image stabilization function is implemented, a representative vector of the second representative vector calculation unit 112 is employed. This switching is controlled based on the electronic enlargement magnification acquired from the electronic enlargement information acquisition unit 113. When the electronic enlargement magnification is equal to or greater than a threshold, the value of the first representative vector calculation unit 111 is output, and when the electronic enlargement magnification is less than the threshold, the value of the second representative vector calculation unit 112 is output.

The image deformation amount calculation unit 115 determines the region size to be read from the image memory 104 based on the electronic enlargement magnification acquired from the electronic enlargement information acquisition unit 113, and determines a position to be read from the image memory 104 based on the representative vector acquired from the representative vector switching control unit 114. Based on the output from the image deformation amount calculation unit 115, the image deformation unit 105 changes the readout position and the readout region size of the image from the image memory 104. The electronic zoom function is implemented by changing the readout region size. The subject tracking function and the electronic image stabilization function are implemented by changing the readout position.

A control unit 120 is a control unit that controls the entire video camera 100 and is connected to each component of the video camera 100 described above. By executing a program stored in a memory 121, the control unit 120 controls each unit of the video camera 100.

Next, the angle of view in image taking, the subject image, the motion vector, and the representative vector in each case where the electronic zoom is low magnification and high magnification will be described using FIGS. 2A to 2H and FIGS. 3A to 3H.

The images illustrated in FIGS. 2A to 2H are images captured under a condition where the electronic zoom magnification is smaller than that of the images illustrated in FIGS. 3A to 3H. The representative vector switching control unit 114 determines whether the electronic enlargement magnification is equal to or greater than the threshold or less than the threshold. It is assumed that the images of FIGS. 2A to 2H are of the electronic enlargement magnification less than the threshold, and the images of FIGS. 3A to 3H are of the electronic enlargement magnification equal to or greater than the threshold.

Figure 2A:
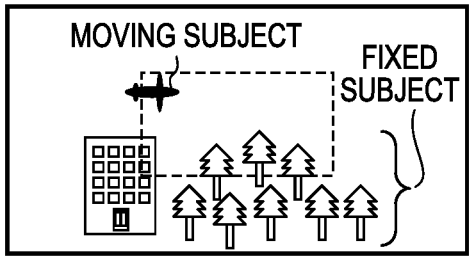
FIGS. 2A to 2H are views illustrating a calculation method of a representative motion vector in low-magnification zoom in the first embodiment.
Figure 2B:
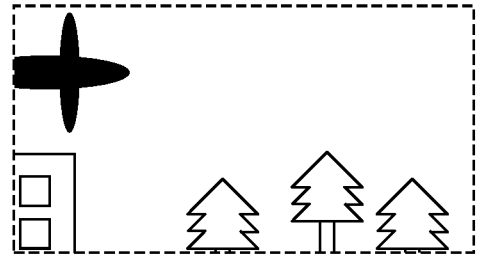
Figure 2C:
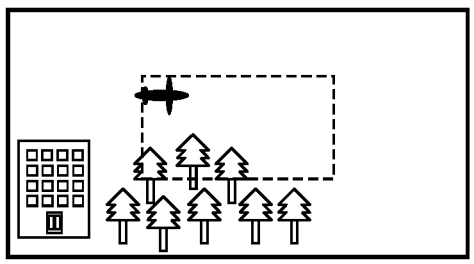
Figure 2D:
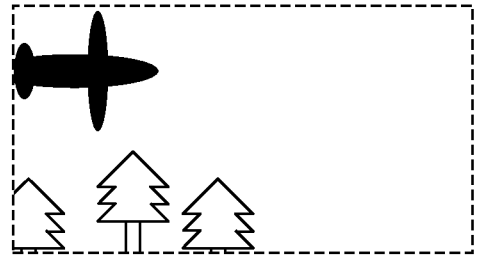
Figure 2E:
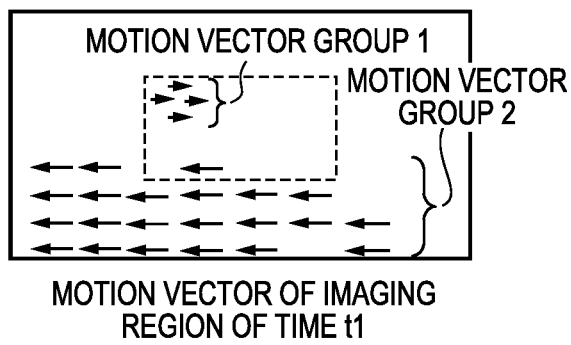

The image captured at time t0 is the image illustrated in FIG. 2A, the frame line indicates the entire imaging region, and the dotted line frame indicates the electronic enlargement region. The image in which the electronic enlargement region of FIG. 2A is enlarged and displayed is the image illustrated in FIG. 2B. Similarly, the image captured at time t1 is the image illustrated in FIG. 2C, and the image in which the electronic enlargement region is enlarged and displayed is the image illustrated in FIG. 2D. FIG. 2E illustrates a motion vector detected between images captured at the times t0 and t1, where the image illustrating only the motion vector in the electronic enlargement region is FIG. 2F.

Figure 2F:
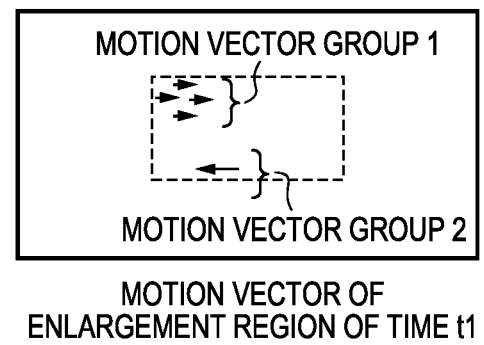
Figure 2G:
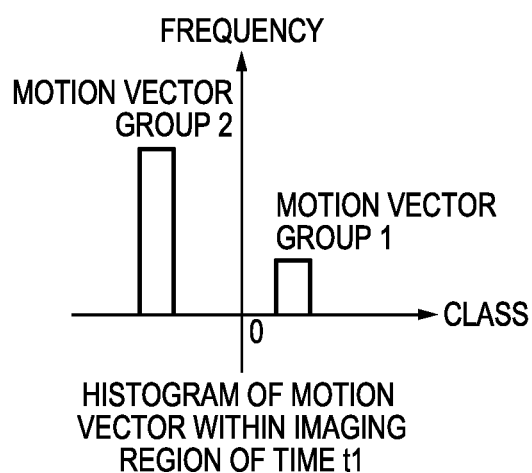
Figure 2H:
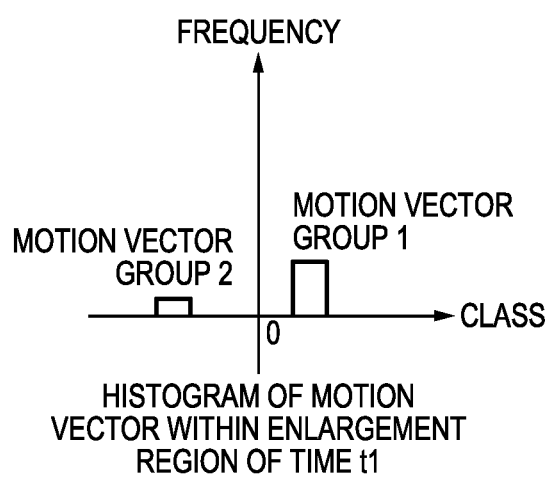

FIG. 2G illustrates a histogram generated from the motion vector of FIG. 2E, and FIG. 2H illustrates a histogram generated from only the motion vector in the electronic enlargement region of FIG. 2F similarly. The horizontal axis of the graph indicates the class, i.e., magnitude of the motion vector, and the vertical axis indicates the frequency, i.e., detection frequency of the motion vector. Note that, as described above, the motion vector is detected by the block matching method, but the arrangement and the like of each block are not illustrated and descriptions thereof will be omitted. Since the camera 100 moves by adjustment of the composition such as subject tracking by the photographer, the position of the fixed subject in the image changes, and thus the value of a motion vector group 2 does not become zero. For regions without description of a motion vector, the background has no feature, and the motion vector is not detectable. That is, the representative vector is selected from either a motion vector group 1 or the motion vector group 2.

In FIGS. 2A to 2H, a motion vector detected based on a moving subject is the motion vector group 1, and a motion vector detected based on a fixed subject (background) is the motion vector group 2. In the entire imaging region, the region where the fixed subject appears is larger than that of the moving subject, and therefore in FIG. 2G, the detection frequency of the motion vector group 2 is greater than the detection frequency of the motion vector group 1. However, when only the electronic enlargement region is extracted, the region occupied by the moving subject is larger than that by the fixed subject, and therefore in FIG. 2H, the detection frequency of the motion vector group 1 becomes greater than the detection frequency of the motion vector group 2. Thus, the motion vector group 2 is selected when the representative vector is determined based on the histogram illustrated in FIG. 2G, and the motion vector group 1 is selected when the representative vector is determined based on the histogram illustrated in FIG. 2H. As illustrated in FIGS. 2F and 2H, processing of extracting a motion vector in the electronic enlargement region and calculating the motion vector with the greatest frequency as a representative vector is the processing performed by the first representative vector calculation unit 111. As illustrated in FIGS. 2E and 2G, processing of extracting a motion vector in the entire imaging region and calculating the motion vector with the greatest frequency as a representative vector is the processing performed by the second representative vector calculation unit 112. The processing performed by the second representative vector calculation unit 112 is known representative vector calculation processing that does not rely on the electronic zoom.

As described earlier, for the image of FIGS. 2A to 2H, since the electronic enlargement magnification is less than the threshold, the histogram illustrated in FIG. 2G is employed so that the representative vector is calculated from the motion vector of the entire imaging region. That is, the motion vector calculated from the background region as the motion vector group 2 is supplied to the image deformation amount calculation unit 115 as a representative vector. Thus, the readout position of the image from the image memory 104 is controlled so as to cancel out the movement amount of the background region, and the electronic image stabilization function is achieved.

Next, representative vector calculation in a case where the electronic zoom magnification becomes equal to or greater than the threshold will be described using FIGS. 3A to 3H.

Figure 3A:
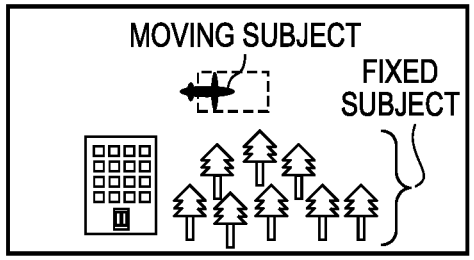
FIGS. 3A to 3H are views illustrating a calculation method of a representative motion vector in high-magnification zoom in the first embodiment.
Figure 3B:
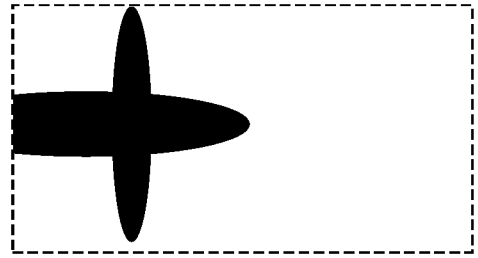

The image captured at time t0 is the image illustrated in FIG. 3A, and the image of which only the electronic enlargement region is displayed is the image illustrated in FIG. 3B. The image captured at time t1 is the image illustrated in FIG. 3C, and the image of which only the electronic enlargement region is displayed is the image illustrated in FIG. 3D. Since the video camera 100 includes only one image deformation unit 105, a plurality of electronic enlargements cannot be performed for one image. However, for an easy-to-understand explanation, it is assumed that images of different electronic enlargement magnifications illustrated in FIGS. 2A to 2H and 3A to 3H can be acquired at time to.

Figure 3C:
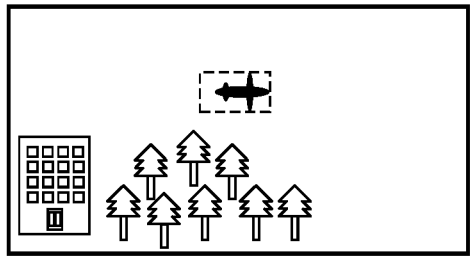
Figure 3D:
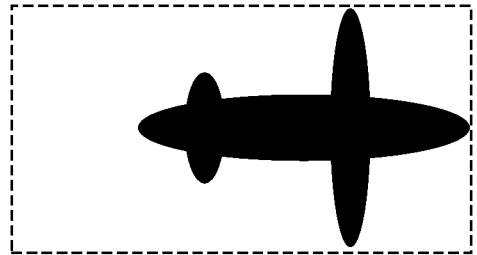
Figure 3E:
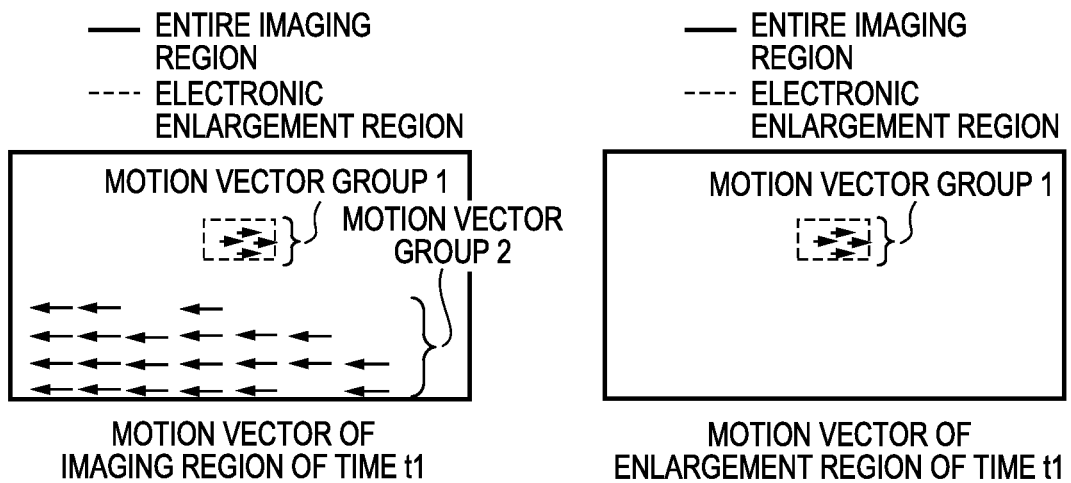
Figure 3F:
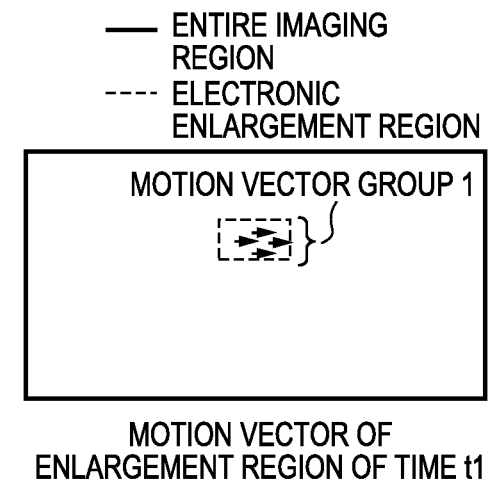
Figure 3G:
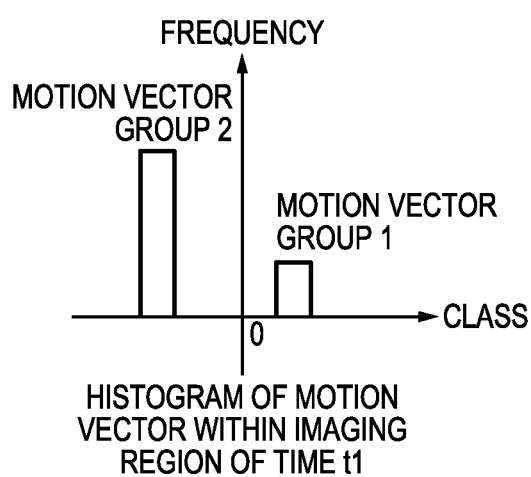
Figure 3H:
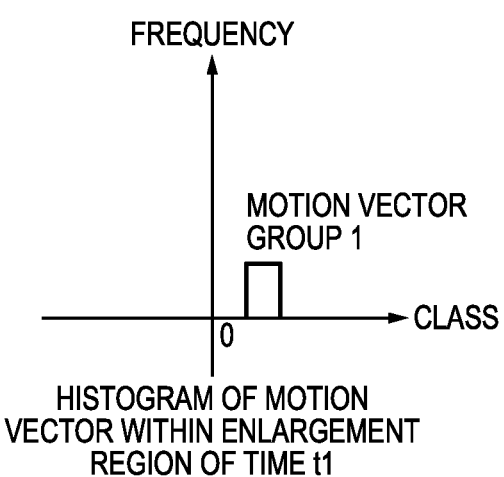

FIG. 3E illustrates a motion vector of the entire imaging region calculated from the images in FIGS. 3A and 3C, and FIG. 3F illustrates only the motion vector calculated from the electronic enlargement region. Similarly to the case of FIGS. 2A to 2H, a motion vector based on a moving subject is the motion vector group 1, and a motion vector based on a fixed subject is the motion vector group 2. FIG. 3G illustrates a histogram generated from the motion vector of the entire imaging region, and FIG. 3H illustrates a histogram generated from the motion vector of the electronic enlargement region. When the motion vector with the greatest frequency is selected from the histogram in FIG. 3G, the motion vector group 2 is selected as a representative vector. When the motion vector with the greatest frequency is selected from the histogram in FIG. 3H, the motion vector group 1 is selected as a representative vector.

The images of FIGS. 3A to 3H have electronic enlargement magnification equal to or greater than the threshold, and hence the histogram illustrated in FIG. 3H is employed so that the representative vector is calculated from the motion vector in the enlargement region. That is, the motion vector calculated from the subject region as the motion vector group 1 is supplied to the image deformation amount calculation unit 115 as a representative vector. Thus, the readout position from the image memory 104 can be changed so as to cancel out the movement amount of the subject region, and the subject tracking function is achieved.

Figure 5:
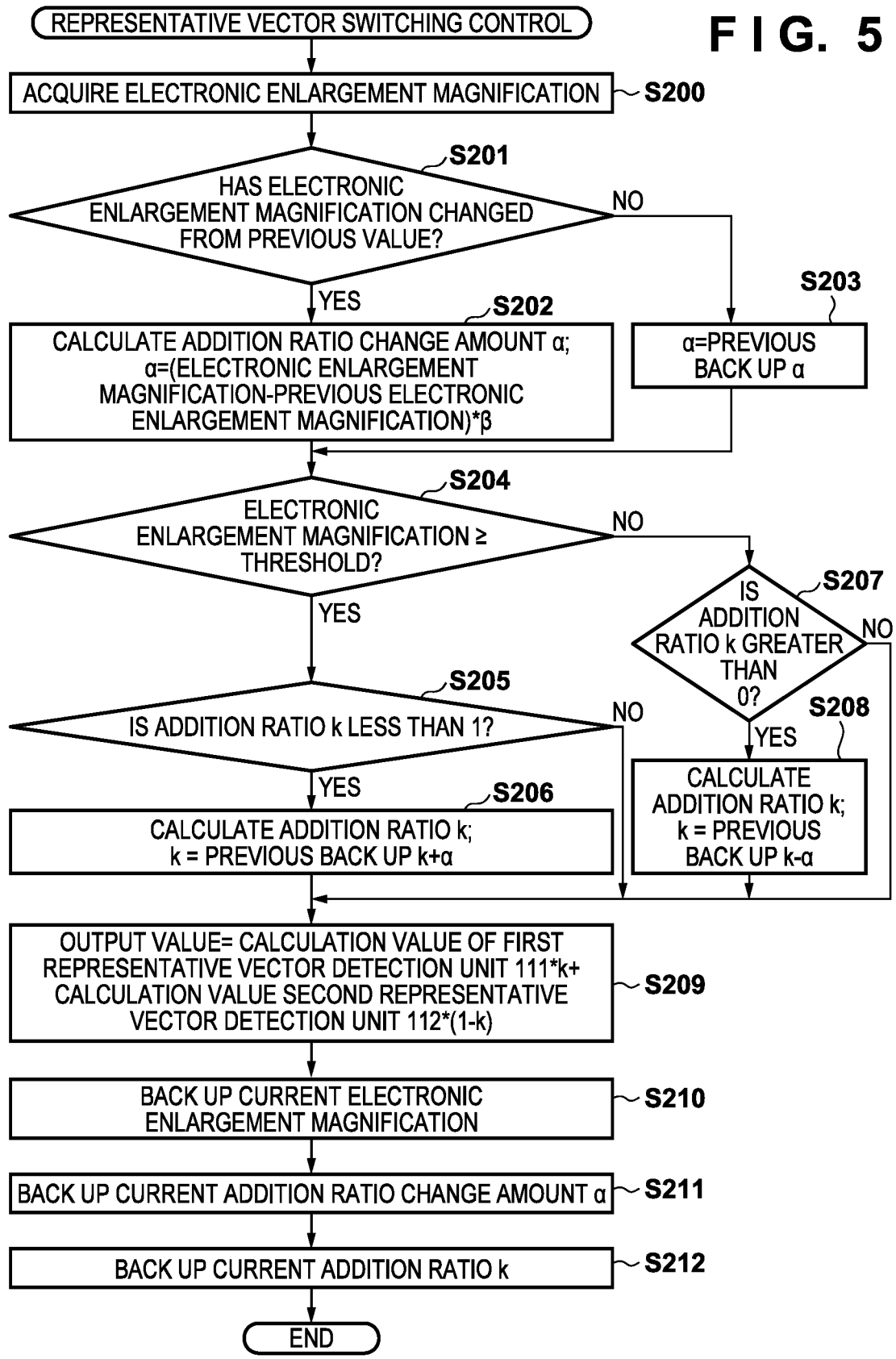
FIG. 5 is a flowchart explaining another example of processing of the representative vector switching control unit in the first embodiment.

Next, the processing of the representative vector switching control unit 114 will be described using the flowcharts of FIGS. 4 and 5. First, a simple switching control is illustrated in FIG. 4. The operations of the flowcharts illustrated in FIGS. 4 and 5 are achieved by the control unit 120 executing a program stored in the memory 121. The operations of the flowcharts of FIGS. 4 and 5 are also performed each time motion vector detection processing is performed. For example, an NTSC image capturing device performs the imaging processing at 1/60 second intervals, and in line with this, motion vector detection processing and the flowcharts illustrated in FIG. 4 and FIG. 5 are performed. That is, the processing cycle of the operations illustrated in FIGS. 4 and 5 is 1/60 second intervals.

In FIG. 4, in step S100, the control unit 120 acquires the currently set electronic enlargement magnification from the electronic enlargement information acquisition unit 113.

In step S101, the control unit 120 determines whether or not the electronic enlargement magnification is equal to or greater than the threshold, and the processing proceeds to step S102 if the electronic enlargement magnification is equal to or greater than the threshold, and the processing proceeds to step S103 if the electronic enlargement magnification is less than the threshold.

In step S102, the representative vector switching control unit 114 selects the vector value calculated by the first representative vector detection unit 111, and outputs the vector value to the image deformation amount calculation unit 115.

In step S103, the representative vector switching control unit 114 selects the vector value calculated by the second representative vector detection unit 112, and outputs the vector value to the image deformation amount calculation unit 115. Due to this, the subject tracking control and the image blur correction control can be switched based on the magnitude of the electronic enlargement magnification. Note that the threshold used in step S101 may be changed based on the magnitude of the optical magnification, the photographing mode, the user setting, and the like.

The above is the method of switching the motion vector simply based on the electronic enlargement magnification, and this switching method has the following problem. That is, when the electronic enlargement magnification is around the threshold, the function having been operating as electronic image stabilization suddenly changes to the subject tracking function, there is a possibility that the angle of view changes suddenly in accordance with the motion of the subject, and there is a possibility of causing an unpleasant feeling to the photographer.

In FIG. 5, in order to solve this problem, the output switching by the representative vector switching control unit 114 has a response characteristic. Note that as described above, the processing of the flowchart of FIG. 5 is also carried out at a processing cycle linked to the cycle of capturing.

In step S200, the control unit 120 acquires the currently set electronic enlargement magnification from the electronic enlargement information acquisition unit 113.

In step S201, the control unit 120 determines whether or not the electronic enlargement magnification has been changed from the value acquired in the previous processing. If changed, the processing proceeds to step S202. If not changed, the processing proceeds to step S203.

In step S202, the control unit 120 calculates an addition ratio change amount $\alpha$. The calculation formula for calculating the addition ratio change amount $\alpha$ can be expressed as a value obtained by multiplying the difference amount between the electronic enlargement magnification and the electronic enlargement magnification at the time of the previous processing, i.e., the electronic enlargement change amount, by a predetermined coefficient $\beta$ $\alpha$=(electronic enlargement magnification−previous electronic enlargement magnification)×$\beta$ The addition ratio change amount $\alpha$ is a value for determining the responsiveness of switching from the above-mentioned electronic image stabilization operation to the subject tracking operation, i.e., how much time to take from when the representative vector switching control unit 114 starts changing the value to output until when the representative vector switching control unit 114 completely switches the value. The smaller the addition ratio change amount $\alpha$ is, the longer period of time it takes to switch the output. If the electronic enlargement magnification is changed continuously by continuing to press down an operation member such as a zoom key, there is a gradual continuity in the electronic enlargement change amount. Thus, as the formula described above, by using this characteristic in calculating the addition ratio change amount $\alpha$, the output switching of the representative vector switching control unit 114 can have a response characteristic. Conversely, in a case where the electronic enlargement is switched on/off each time the button is pressed down, the electronic enlargement change amount becomes a sharply large value, and the addition ratio change amount $\alpha$ also becomes a sharply large value. Due to this, the output of the representative vector switching control unit 114 is immediately switched.

The coefficient $\beta$ in the above equation is a parameter for determining how fast to switch from the electronic image stabilization operation to the subject tracking operation in accordance with the electronic zoom operation, and is an arbitrary value predetermined in consideration of the operability. The smaller value the coefficient $\beta$ is, the longer the period of time required for the switching to be completed.

In step S203, the control unit 120 sets the addition ratio change amount $\alpha$ so as to use the value at the time of the previous processing. Even if the electronic zoom operation is interrupted immediately after the electronic enlargement magnification exceeds the threshold for example, the processing is for continuing the switching control until the switching of the output of the representative vector switching control unit 114 is complete.

In step S204, the control unit 120 compares the electronic enlargement magnification with the threshold. The processing proceeds to step S205 if the electronic enlargement magnification is equal to or greater than the threshold, and the processing proceeds to step S206 if the electronic enlargement magnification is less than the threshold.

In step S205, the control unit 120 determines whether or not an addition ratio k is less than 1, and performs step S206 if the addition ratio k is less than 1. Note that the addition ratio k is a value obtained by adding or subtracting the addition ratio change amount a for each iteration of the processing of FIGS. 5, and 0≤k≤1 is a possible value of the addition ratio k. In step S206, the control unit 120 sets, as a new addition ratio k, the value in which the addition ratio change amount $\alpha$ is added to the addition ratio k of the previous processing. Note that the determination processing in step S205 is performed in order not to make the addition ratio k a value greater than 1.

In step S207, the control unit 120 determines whether or not the addition ratio k is greater than 0, and performs step S208 if the addition ratio k is greater than 0. In step S208, the value in which the addition ratio change amount a is subtracted from the addition ratio k of the previous processing is made the new addition ratio k. Note that the determination processing in step S207 is performed in order not to make k a value smaller than 0.

In step S209, the control unit 120 sets, as the output value of the representative vector switching control unit 114, a value in which the output value of the first representative vector detection unit 111 and the output value of the second representative vector detection unit 112 are averaged in accordance with the value of the addition ratio k. This is expressed by the following formula.

output value=(output of first representative vector detection unit 111)×k+(output of second representative vector detection unit 112)×(1−k)

For example, when the electronic enlargement magnification is manipulated from a small state to a large state and the electronic enlargement magnification exceeds the threshold, the output value is switched from the output value of the second representative vector calculation unit 112 to the output value of the first representative vector calculation unit 111 in accordance with the electronic zooming speed. That is, the ratio at which the output value of the first representative vector calculation unit 111 is used gradually increases due to the addition of the addition ratio change amount $\alpha$ to the addition ratio k every one cycle in FIG. 5, and is eventually switched to the output value of the first representative vector calculation unit 111. Even if the electronic zoom operation stops in the middle of the switching, switching control is continued until complete switching to the output value of the first representative vector calculation unit 111 by the processing of step S203. The value of k becomes 1 at the time point when the switch is completed, and k is limited up to 1 by the determination in step S205.

Subsequently, the control unit 120 backs up the current electronic enlargement magnification at step S210, backs up the current addition ratio change amount a in step S211, backs up the current addition ratio k in step S212, and prepares for the next processing.

The above processing can reduce sharp change in an angle of view due to function switching between electronic image stabilization and subject tracking when the electronic enlargement magnification exceeds the threshold in the electronic zoom operation. In a case where the operation of switching on/off of the electronic enlargement function is possible, the above-described switching control can be completed instantly, and electronic image stabilization and subject tracking are switched without delay.

Next, the threshold of the electronic enlargement magnification for performing switching between the electronic image stabilization operation and the subject tracking operation will be described using FIGS. 6A to 6C. The greater the electronic enlargement magnification is, the greater a change in the angle of view due to hand shake of the photographer becomes, and the subject becomes less likely to be caught in the screen. This will be described using FIGS. 6A to 6C.

Figure 6A:
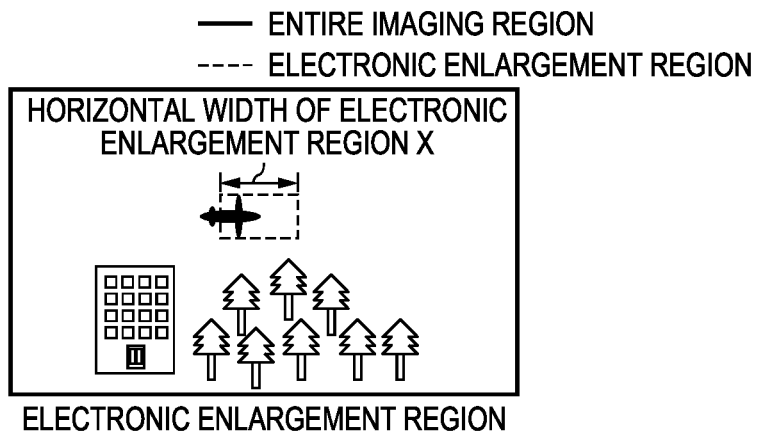
FIGS. 6A to 6C are views explaining a representative vector switching threshold in the first embodiment.
Figure 6B:
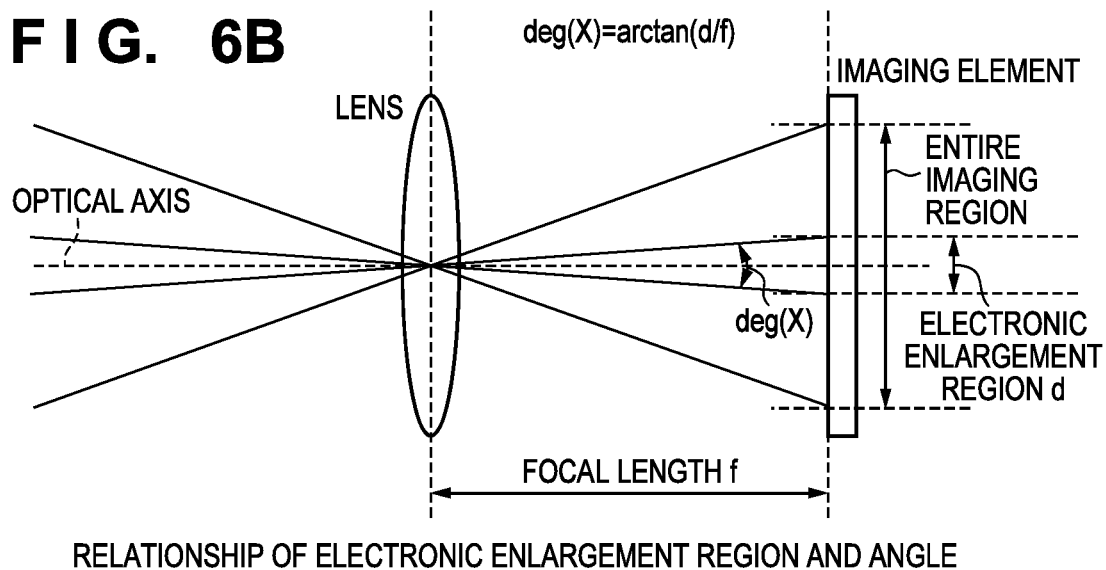

As illustrated in FIG. 6A, the horizontal width (width in the horizontal direction) of the electronic enlargement region is X. FIG. 6B is a view illustrating the relationship between the lens and the imaging element. The value in which the horizontal width X is converted into a physical quantity on the imaging element is d, and the focal length is f Both f and d are in the same units, for example, millimeters. The value obtained by angularly converting the electronic enlargement region d is deg(X). Here, deg(X) can be expressed by a formula of arctan(d/f).

Figure 6C:
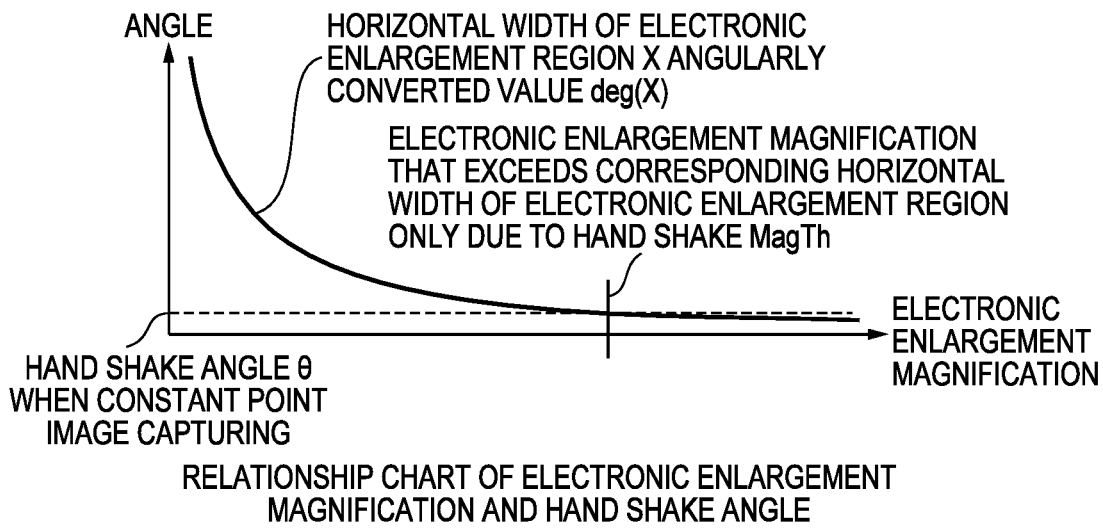

FIG. 6C is a view illustrating the relationship between a hand shake angle θ of the photographer when capturing at a fixed point and deg(X) described above. Here, capturing at a fixed point means capturing with the camera held by hand without using a tripod or the like. It is a method of capturing, in capturing a fixed subject or the like, with the camera firmly held so as not to change the angle of view in image taking as much as possible, and a capturing method with the minimum hand shake in capturing with the camera held by hand.

The larger the electronic enlargement magnification becomes, the smaller deg(X) becomes. This is because, as illustrated in FIG. 6B, the smaller the electronic enlargement region becomes, the smaller the value of arctan(d/f) indicated by the above-mentioned formula becomes. Here, the electronic enlargement magnification where deg(X) becomes less than θ is defined as MagTh. MagTh can be expressed by Xorg/X, where the horizontal width of the entire imaging region is Xorg. When the electronic enlargement magnification reaches MagTh, the photographer generates a change in an angle of view that is equal to or greater than the horizontal width of the electronic enlargement region due to his own hand shake amount. That is, even if the photographer intended to capture an image without moving the camera, the resulting video has a subject appeared on the right end of the screen, for example, is moved to the left end of the screen due to hand shake.

When the angle of view movement due to hand shake becomes large in this manner, it becomes difficult for the photographer to capture the subject within the screen. Even if the influence of hand shake can be avoided by the image blur correction function of the camera, in a situation where the screen moves by the horizontal width of the electronic enlargement region just with hand shake, it is still difficult for the photographer to put the subject within the image capturing screen by his own camera operation. On the other hand, in the case of a small enlargement magnification in a range where the photographer can track the subject by his own camera operation, it is preferable for the camera not to inhibit the operation of the photographer as much as possible. Hence, when the electronic enlargement magnification is less than the threshold, the subject tracking as a camera function is stopped, and the electronic image stabilization is performed to correct only unnecessary image blur for the photographer. On the other hand, when the electronic enlargement magnification exceeds MagTh, the function is switched to subject tracking, not image blur correction, so that the photographer easily captures the subject.

Note that for the blur angle θ when capturing at a fixed point of the photographer described above, the average hand shake amount obtained by measuring the past hand shake of the photographer is used. Alternatively, a predetermined hand shake amount may be used.

in the description above, the horizontal width of the electronic enlargement region has been described, but the same applies to the vertical width.

As described above, in the first embodiment of the present invention, the motion vector used to change the readout position from the captured image is selected, in accordance with the electronic enlargement magnification, from the motion vector calculated from the electronic enlargement region and the motion vector calculated from the entire imaging region. This enables the photographer to track the subject with the camera function and perform good capturing when the electronic enlargement magnification becomes an electronic enlargement magnification in which the photographer has difficulty in tracking the subject by his own camera operation.

Second Embodiment

Next, the second embodiment of the present invention will be described. The only image blur correction function included in the video camera of the first embodiment is the electronic image stabilization function. In addition to the electronic image stabilization function, a video camera 200 of the present embodiment also includes an optical image stabilization function. The electronic image stabilization is processing that is dependent on the cycle of capturing as described above, whilst the optical image stabilization performs processing at a shorter cycle than the electronic image stabilization, and thus high-frequency image blur components that cannot be corrected by the electronic image stabilization can be reduced.

Figure 7:
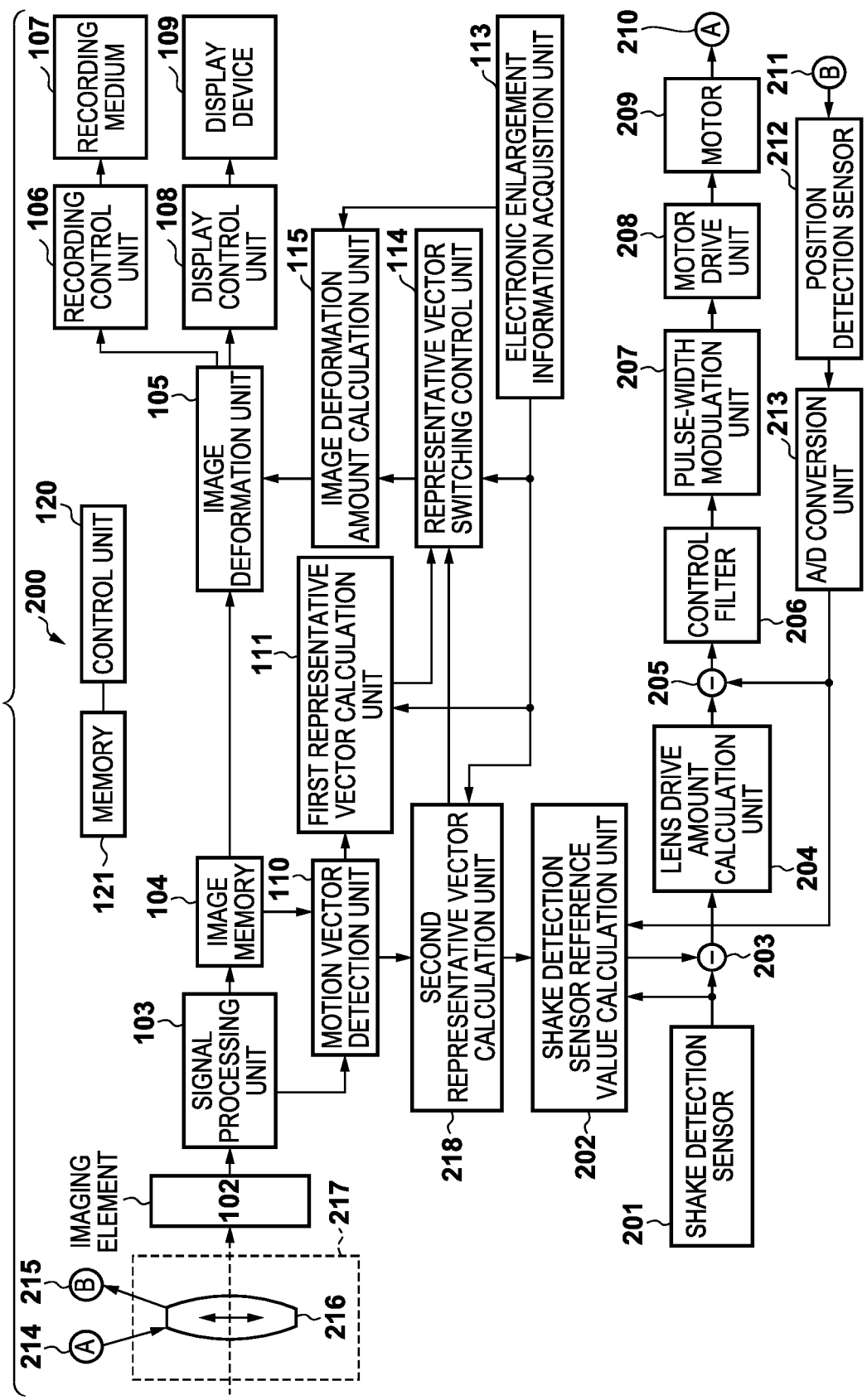
FIG. 7 is a block diagram illustrating a configuration of a video camera in a second embodiment.

FIG. 7 is a block diagram illustrating the configuration of the video camera 200 that is the second embodiment of the image processing apparatus of the present invention. Note that in the description of the video camera 200, blocks similar to those of the video camera 100 described in the first embodiment are given the same reference signs, and descriptions thereof will be omitted.

In the present embodiment, the shake applied to the video camera 200 is detected by a shake detection sensor 201. The shake detection sensor 201 is an angular velocity sensor that detects, for example, the shake of the video camera 200 as an angular velocity. Note that in a case where the shake detection sensor 201 is an analog element whose output voltage changes in accordance with the shake amount, the shake is output to a shake detection sensor reference value calculation unit 202 or a subtractor 203 after converted into digital data via an A/D converter.

The shake detection sensor reference value calculation unit 202 calculates a reference value of the shake detection sensor 201. The reference value of the shake detection sensor 201 is an output value of the shake detection sensor 201 when no shake occurs in the video camera 200. Details of the calculation method of the reference value will be described later.

The subtractor 203 subtracts the reference value calculated by the shake detection sensor reference value calculation unit 202 from the output of the shake detection sensor 201. By this processing, the value output from the subtractor 203 becomes highly accurate shake information from which unnecessary reference value components have been removed.

A lens drive amount calculation unit 204 calculates a drive target position of a blur correction lens 216 based on the shake amount of the video camera 200 output from the subtractor 203. The processing of the lens drive amount calculation unit 204 includes, for example, integration processing for calculating an angle from the angular velocity, correction processing of the drive target position of the blur correction lens 216 in accordance with the focal distance and the subject distance, and processing of converting the corrected drive target position into units of positional information output from an A/D converter 213.

The difference amount between the output of the lens drive amount calculation unit 204 and the output of the A/D converter 213 that digitizes the output of the position detection sensor 212 is calculated by a subtractor 205. Here, the output of the subtractor 205 is described as the deviation amount. A control filter 206 carries out signal processing such as amplification and phase compensation for the deviation amount. A pulse width modulation unit 207 modulates the output of the control filter 206 into a waveform (i.e., PWM waveform) that changes the duty ratio of the pulse wave and outputs it. A motor drive unit 208 is a circuit to apply a driving signal to a motor 209. Specifically, for example, the motor drive unit 208 is an H-bridge circuit and the motor 209 is a voice coil type motor. The output of the pulse width modulation unit 207 applies a voltage from the H-bridge circuit to the terminal of the voice coil type motor, and the amount of current flowing through the coil changes, thereby generating a driving force that moves the blur correction lens 216. Note that, the diagram illustrates that a terminal A210 and a terminal A214 are electrically connected, and similarly, a terminal B211 and a terminal B215 are also electrically connected.

The position detection sensor 212 includes a magnet and a Hall sensor provided at a position opposite thereto, and when the blur correction lens 216 moves, the magnetic flux applied on the Hall sensor changes and the output voltage changes. An operation amplifier circuit that amplifies the output of the Hall sensor may be used. Thus, the position detection sensor 212 is referred by including the circuit provided in front of the A/D converter 213.

The output of the position detection sensor 212 is supplied to the subtractor 205 and the shake detection sensor reference value calculation unit 202 via the A/D converter 213. An imaging lens 217 is an imaging optical system including a plurality of lens groups including the blur correction lens 216. The blur correction lens 216 is, for example, a shift lens, and is an optical system that deflects the optical axis by moving on a plane perpendicular to the optical axis. In this way, in a case where the current position has not reached with respect to the target position of the blur correction lens 216, the unreached amount is calculated as the deviation amount, and a feedback control system that always corrects the deviation amount can be configured by driving the blur correction lens 216.

In a second representative vector calculation unit 218, the processing of calculating the representative vector is the same as the processing in the first embodiment, but the shake detection sensor reference value calculation unit 202 is added to the output target. Therefore, another reference sign is given to distinguish from the second representative vector calculation unit 112.

Hereinafter, the processing performed by the shake detection sensor reference value calculation unit 202 will be described. Note that the reference value calculation of the shake detection sensor is a known technique, and thus an outline will be described.

In the output signal of the shake detection sensor 201, the output when the applied shake is zero fluctuates depending on environmental conditions such as open-air temperature. That is, the output of the shake detection sensor 201 is a signal in which an output fluctuation when the shake is zero is superimposed on a signal representing the shake amount of the video camera 200. Thus, the shake detection sensor reference value calculation unit 202 calculates the output when the shake applied to the shake detection sensor 201 is zero, i.e., the reference value, and subtracts this from the original signal. In this way, the exact shake amount can be calculated. In the present embodiment, a method using a motion vector is used for the calculation method of the reference value. If the output when the shake is zero fluctuates, the shake detection sensor 201 is superimposed with this reference value fluctuation amount. Therefore, even if image blur correction is performed using the output signal of the shake detection sensor 201 as is, accurate image blur correction cannot be performed, and the correction remaining occurs. Since this correction remaining appears as a blur amount in the video, the motion vector amount can be regarded equivalent to the correction remaining amount.

Based on this idea, it is possible to calculate the reference value by subtracting (angular conversion value of the position of the blur correction lens 216+blur remaining angle) from an angular conversion value of the output of the shake detection sensor 201. This blur remaining angle is an angular conversion value of the motion vector.

Here, in order to achieve the above-described method, the motion vector used in the reference value calculation needs to be calculated based on the shake of the video camera 200. To this end, the shake detection sensor reference value calculation unit 202 is always input with a representative vector based on the background region calculated by the second representative vector calculation unit 218 regardless of the electronic enlargement region.

As described above, in the second embodiment of the present invention, the image deformation amount calculation unit 115 is supplied with the output of the representative vector switching control unit 114 that varies depending on the electronic enlargement magnification, and a motion vector based on the background region calculated by the second representative vector calculation unit is supplied to the reference value calculation. Due to this, a good video capturing can be achieved by optical image stabilization with the control of switching between the electronic image stabilization and the subject tracking by the electronic enlargement magnification as illustrated in the first embodiment as it is.

Note that in the above-described embodiment, the method in which the subject tracking performed when the electronic enlargement magnification becomes equal to or greater than the threshold is performed by changing the image readout position has been described. However, this subject tracking may be performed using the blur correction lens 216. For example, a value obtained by performing a filter calculation such as a predetermined phase compensation or amplification processing to the representative vector is added to the drive amount calculated by the lens drive amount calculation unit 204. This allows the blur correction lens 216 to correct even low-frequency components. By applying this, it is possible to perform subject tracking while correcting high-frequency blur by the blur correction lens 216.

Figure 8:
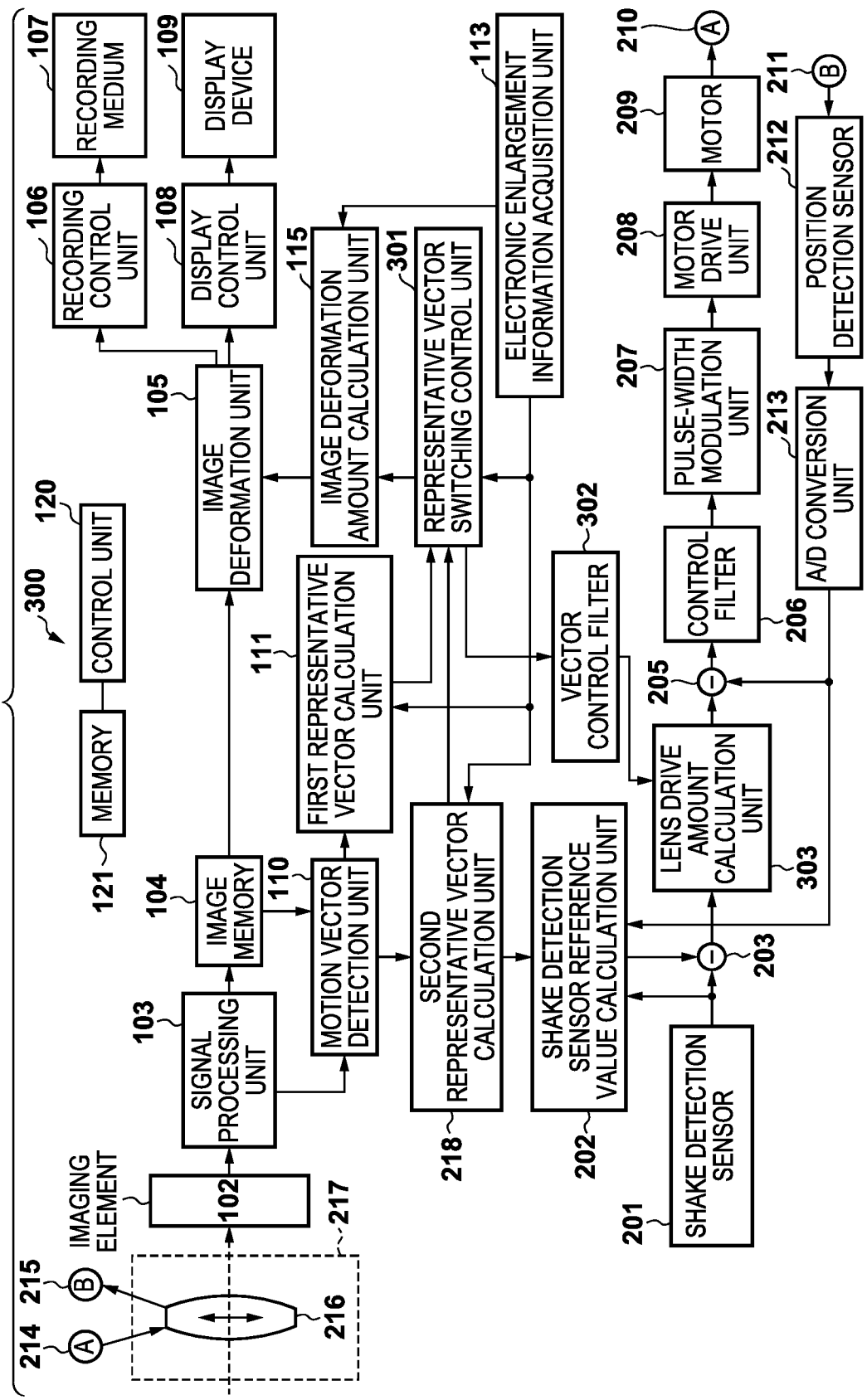
FIG. 8 is a block diagram illustrating another configuration of the video camera in the second embodiment.

A video camera 300 illustrated in FIG. 8 is obtained by changing input and output of a representative vector switching control unit 301 and a lens drive amount calculation unit 303 with respect to the video camera 200 and further adding a vector control filter 302 to the video camera 200. The vector control filter 302 is a circuit that performs filter calculation processing of performing phase compensation and the like described above. When the electronic enlargement magnification is equal to or greater than the threshold, as described so far, a representative vector based on subject movement is output from the representative vector switching control unit 301. This representative vector is subjected to phase compensation and the like through the vector control filter 302, and is input to the lens drive amount calculation unit 303.

In the lens drive amount calculation unit 303, the subject movement amount output from the vector control filter 302 is superimposed on the drive amount of the blur correction lens 216 calculated based on the shake amount detected by the shake detection sensor 201. Due to this, the blur correction lens 216 performs subject tracking together with image blur correction, and the subject image input to the imaging element 102 becomes an image in which the shift in the main subject position has been corrected. The value detected by the motion vector detection unit 110 in this case is an amount that has not been tracked by the blur correction lens 216, i.e., the tracking remaining amount. However, the processing as described above is performed, and thus the tracking remaining amount is electronically corrected also by the image deformation unit 105. From the above, with the configuration of the video camera 300, the optical subject tracking by a lens and the electronic subject tracking by readout position change are used in combination. Therefore, it is possible to track the larger movement of a subject than the video camera 100 or the video camera 200 can track.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-017741, filed Feb. 5, 2021, which is hereby incorporated by reference herein in its entirety.

What is claimed is:

1. An image processing apparatus comprising:
at least one processor or circuit configured to function as:
an electronic zoom unit configured to enlarge and output a predetermined region from a captured image;
a motion vector detection unit configured to detect a motion vector from a plurality of captured images;
a first representative vector calculation unit configured to calculate a first representative motion vector by setting a weight of a first motion vector detected in the predetermined region greater than a weight of a second motion vector detected in a region outside the predetermined region;
a second representative vector calculation unit configured to calculate a second representative motion vector by setting a weight of the second motion vector with respect to the first motion vector greater than the first representative vector calculation unit; and
a third representative vector calculation unit configured to calculate a third representative motion vector based on the first representative motion vector and the second representative motion vector,
wherein the third representative vector calculation unit
determines the third representative motion vector by setting a weight of the first representative motion vector greater than a weight of the second representative motion vector when an enlargement magnification in the electronic zoom unit is equal to or greater than a threshold, and
determines the third representative motion vector by setting a weight of the second representative motion vector greater than a weight of the first representative motion vector when an enlargement magnification in the electronic zoom unit is less than the threshold.

2. The image processing apparatus according to claim 1, wherein
the first representative vector calculation unit calculates the first motion vector and outputs the first motion vector as the first representative motion vector, and
the second representative vector calculation unit calculates the second motion vector and outputs the second motion vector as the second representative motion vector.

3. The image processing apparatus according to claim 1, wherein the third representative vector calculation unit determines the first representative motion vector as the third representative motion vector when an enlargement magnification at the electronic zoom unit is equal to or greater than the threshold, and determines the second representative motion vector as the third representative motion vector when an enlargement magnification at the electronic zoom unit is less than the threshold.

4. The image processing apparatus according to claim 1, wherein the third representative vector calculation unit outputs a value in which the first representative motion vector and the second representative motion vector are averaged at a predetermined ratio.

5. The image processing apparatus according to claim 4, wherein when an enlargement magnification in the electronic zoom unit is equal to or greater than the threshold, the third representative vector calculation unit outputs an averaged value according to an addition ratio, the addition ratio changed so that an addition ratio weight of the first representative motion vector gradually becomes large and an addition ratio weight of the second representative motion vector gradually becomes small.

6. The image processing apparatus according to claim 5, wherein the third representative vector calculation unit determines a change amount of the addition ratio in accordance with a change amount in an enlargement magnification in the electronic zoom unit.

7. The image processing apparatus according to claim 6, wherein the third representative vector calculation unit increases a change amount of the addition ratio as a change amount in an enlargement magnification in the electronic zoom unit increases.

8. The image processing apparatus according to claim 3, wherein the threshold is a value calculated based on a first shake angle obtained by measuring a past hand shake of a photographer or a second shake angle due to a predetermined hand shake, and a value in which a change amount of an angle of view based on the first shake angle or the second shake angle becomes equal to or greater than a horizontal or vertical width of the predetermined region enlarged by the electronic zoom unit.

9. The image processing apparatus according to claim 1, wherein the at least one processor or circuit is configured to further function as an angle of view changing unit that changes an angle of view in image taking based on an output of the third representative vector calculation unit.

10. The image processing apparatus according to claim 1, wherein the at least one processor or circuit is configured to further function as a reference value calculation unit that calculates a reference value that is an output of a shake detection sensor without an occurrence of shake, the output of the shake detection sensor changes in accordance with a shake amount, wherein the reference value calculation unit calculates the reference value based on an output of the second representative vector calculation unit regardless of an enlargement magnification in the electronic zoom unit.

11. The image processing apparatus according to claim 10, wherein the at least one processor or circuit is configured to further function as a control unit that controls movement of a blur correction lens, which is an optical system provided in an imaging optical system and deflects an optical axis based on an output of the shake detection sensor.

12. The image processing apparatus according to claim 11, wherein the control unit further moves the blur correction lens based on an output of the third representative vector calculation unit.

13. An image processing method, comprising:
performing electronic enlargement of enlarging and outputting a predetermined region from a captured image;
detecting a motion vector from a plurality of captured images;
calculating a first representative motion vector by setting a weight of a first motion vector detected in the predetermined region greater than a weight of a second motion vector detected in a region outside the predetermined region;
calculating a second representative motion vector by setting a weight of the second motion vector greater than a weight of the first motion vector; and
calculating a third representative motion vector based on the first representative motion vector and the second representative motion vector, wherein in calculation of the third representative motion vector, the third representative motion vector is determined by setting a weight of the first representative motion vector greater than a weight of the second representative motion vector when an enlargement magnification in the electronic enlargement is equal to or greater than a threshold, and the third representative motion vector is determined by setting a weight of the second representative motion vector greater than a weight of the first representative motion vector when an enlargement magnification in the electronic enlargement is less than the threshold.

14. A non-transitory computer-readable storage medium that stores a program for causing a computer to execute an image processing method, the image processing method comprising:
performing electronic enlargement of enlarging and outputting a predetermined region from a captured image;
detecting a motion vector from a plurality of captured images;
calculating a first representative motion vector by setting a weight of a first motion vector detected in the predetermined region greater than a weight of a second motion vector detected in a region outside the predetermined region;
calculating a second representative motion vector by setting a weight of the second motion vector greater than a weight of the first motion vector; and
calculating a third representative motion vector based on the first representative motion vector and the second representative motion vector, wherein in calculation of the third representative motion vector, the third representative motion vector is determined by setting a weight of the first representative motion vector greater than a weight of the second representative motion vector when an enlargement magnification in the electronic enlargement is equal to or greater than a threshold, and the third representative motion vector is determined by setting a weight of the second representative motion vector greater than a weight of the first representative motion vector when an enlargement magnification in the electronic enlargement is less than the threshold.

15. An image processing apparatus comprising:
at least one processor or circuit configured to function as:
an electronic zoom unit configured to enlarge and output an enlarged region from a captured image, the enlarged region not including a peripheral region of the captured image that is outside the enlarged region;

a motion vector detection unit configured to detect a first motion vector in the enlarged region and a second motion vector in the peripheral region, from a plurality of captured images;

a control unit configured to control an image blur correction operation based on at least one of the motion vectors detected by the motion vector detection unit, wherein the control unit changes a method of controlling the image blur correction operation based on an enlarge magnification of the electronic zoom unit, and wherein in a case where the enlarge magnification is equal to or greater than a threshold value, the control unit controls the image blur correction operation to reduce a moving amount of a subject in the enlarged region in the captured image, and in a case where the enlarge magnification is less than the threshold value, the control unit controls the image blur correction operation to reduce a moving amount of a background in the captured image.

16. The image processing apparatus according to claim 15, wherein in a case where the enlarge magnification is equal to or greater than the threshold value, the control unit controls the image blur correction operation by setting a weight of the first motion vector greater than a weight of the second motion vector, and in a case where the enlarge magnification is less than the threshold value, the control unit controls the image blur correction operation by setting a weight of the second motion vector greater than a weight of the first motion vector.

17. The image processing apparatus according to claim 15, wherein the at least one processor or circuit is configured to further function as an electronic image blur correction unit, and the control unit controls the image blur correction operation by controlling the electronic image blur correction unit.

18. The image processing apparatus according to claim 15, wherein the control unit controls the image blur correction operation by controlling a position of an image blur correction lens provided in an imaging optical system.

19. The image processing apparatus according to claim 15, wherein in a case where the enlarge magnification is equal to or greater than the threshold value, the control unit controls the image blur correction operation using the first motion vector, and acquires a reference value of an angular velocity sensor using the second motion vector.

20. The image processing apparatus according to claim 15, wherein the at least one processor or circuit is configured to further function as a display control unit configured to control a display unit to display an image corresponding to the enlarged region.

21. The image processing apparatus according to claim 15, wherein in a case where the enlarge magnification is equal to or greater than the threshold value, the control unit controls the image blur correction operation based on the first motion vector.

22. The image processing apparatus according to claim 15, wherein in a case where the enlarge magnification is less than the threshold value, the control unit controls the image blur correction operation based on second motion vector.

23. The image processing apparatus according to claim 15, wherein in a case where the enlarge magnification is equal to or greater than the threshold value, the control unit controls the image blur correction operation such that the moving amount of the subject in the captured image becomes smaller than the moving amount of the background in the captured image.

24. The image processing apparatus according to claim 15, wherein in a case where the enlarge magnification is less than the threshold value, the control unit controls the image blur correction operation such that the moving amount of the background becomes smaller than the moving amount of the subject.

* * * * *